United States Patent [19]
Sanders

[11] 3,787,077
[45] Jan. 22, 1974

[54] ANTI-SWAY BAR
[76] Inventor: Louis J. Sanders, 418 S. Smith St., Aurora, Ill. 60505
[22] Filed: Mar. 2, 1973
[21] Appl. No.: 337,453

[52] U.S. Cl. .................. 280/446 B, 280/432 X
[51] Int. Cl. ............................................ B60d 1/14
[58] Field of Search ............ 280/446 B, 432, 406 A

[56] References Cited
UNITED STATES PATENTS
3,294,421  12/1966  Mathisen ..................... 280/446 B
3,502,351   3/1970  Gray ............................ 280/446 B
3,531,139   9/1970  Hedgepeth ................... 280/446 B FOREIGN PATENTS OR APPLICATIONS
1,490,600   6/1967  France ......................... 280/446 B
1,575,870   7/1969  France ......................... 280/446 B Primary Examiner—Leo Friaglia
Attorney, Agent, or Firm—Axel A. Hofgren et al.

[57] ABSTRACT
An anti-sway bar mechanism for a trailer driven by automobile or truck including first and second pivotal connections on the trailer and driving vehicle, respectively, a split cylindrical member extending from the trailer pivotal connection and a rod telescoping in the cylindrical member and extending from the other pivotal connection, there being provided an arcuate pressure plate which is actuated by a flat actuator or clamping plate to press the split cylindrical member and an associated frictional element into engagement with the rod member to vary the clamping force on the rod member and provide variable resistance to sway, there also being provided an actuating member for the arcuate pressure plate that is threaded into the actuating plate and spring biased to a retracted position, the actuating plate being held in position by a plate on the opposite side of the pressure plate connected to the bottom of the split cylindrical member that has threaded members connected to the actuating plate with the actuating plate and the bottom plate being urged apart to urge the pressure plate to its non-pressure position to assist in releasing the anti-sway pressure on the rod member.

6 Claims, 4 Drawing Figures

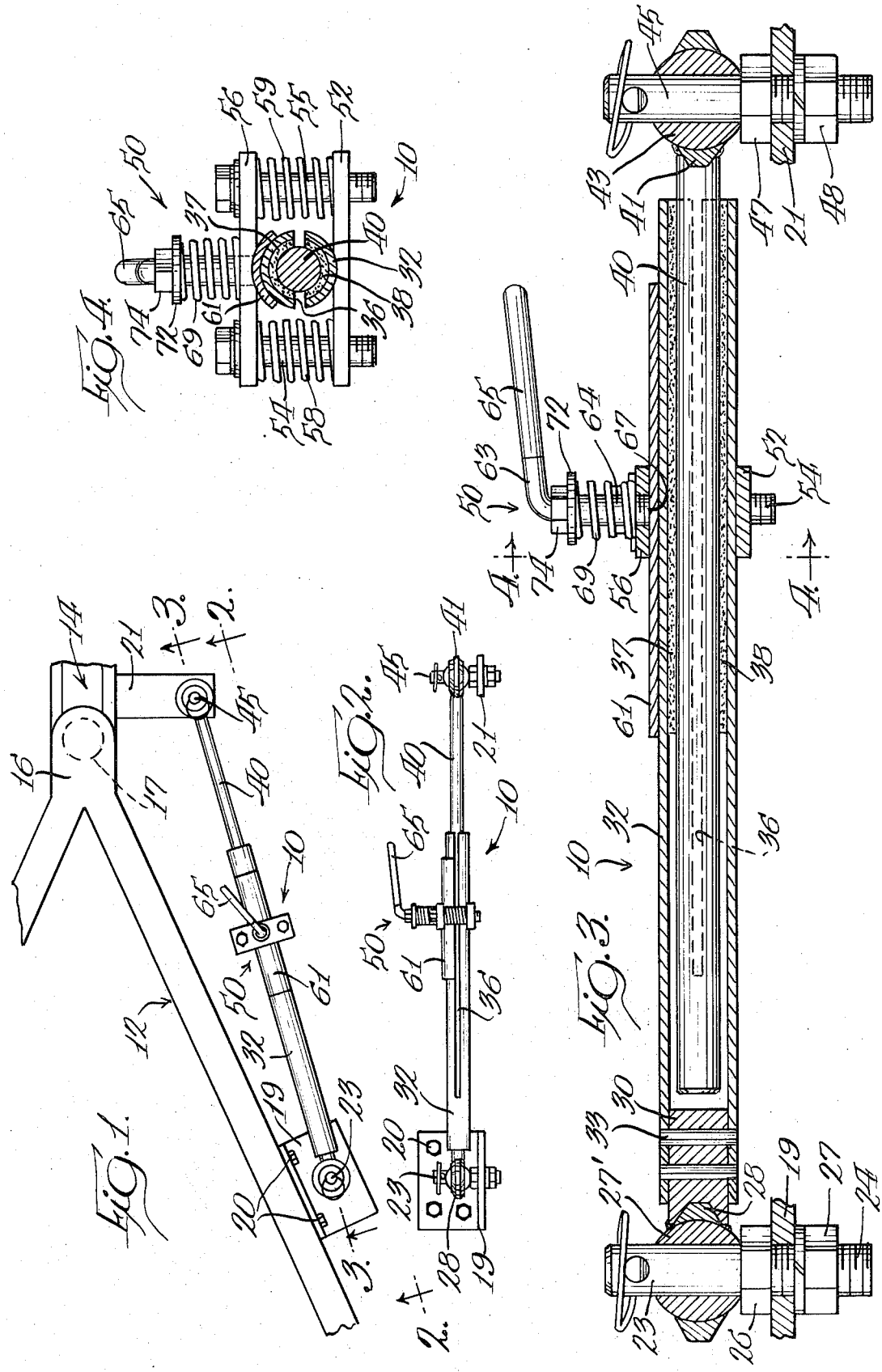

ANTI-SWAY BAR

BACKGROUND OF THE PRESENT INVENTION

There have been provided in the past a plurality of anti-sway bar mechanisms between a driving vehicle and a trailer pivotally connected thereto at a single point pivot oftentimes referred to as a ball trailer hitch.

These anti-sway bar mechanisms provide a horizontal resistance that inhibits to the degree desired the relative pivotal movement between the trailer and the driving vehicle. Such sway bar mechanisms are extremely desirable when the trailer has the characteristic of swaying or oscillating when driving over irregular surfaces, around sharp turns or under high speed pulling conditions.

Sway bar mechanisms in the past have been difficult to actuate and have frequently not provided the necessary resistance to swaying that is required to dampen the tendency of the trailer to oscillate with respect to the driving vehicle.

One such prior art mechanism is illustrated in the Mathisen U.S. Pat. No. 3,294,421 that shows a rectangular anti-sway bar mechanism. The rectangular construction of this anti-sway bar mechanism severely limits the effective resistance to sway. Moreover the Mathisen actuating mechanism in the primary embodiment includes a very complicated cam arrangement that is expensive to manufacture and also does not achieve any positive position that will withstand vibration under load and still maintain the desired anti-sway resistance.

It is a primary object of the present invention to obviate these prior art problems.

SUMMARY OF THE PRESENT INVENTION

In accordance with the present invention an anti-sway bar mechanism is provided for use between a driving vehicle and a trailer to maximize the anti-sway bar characteristics over prior art devices and also to simplify the variation in anti-sway resistance in a simple to operate manner.

Toward this end a cylindrical rod is universally interconnected with the one side of the trailer tongue and a cylindrical rod telescoped within the cylindrical member is universally connected to the vehicle at a point spaced from the pivotal inter-connection between the trailer and the driving vehicle. The cylindrical tubular member is split and has arcuate frictional elements therein that are variably clamped against the rod to vary the telescopic resistance and the anti-sway characteristics of the mechanism.

To actuate the clamping of the split cylindrical member toward the rod in a simple and improved manner, an arcuate pressure plate is provided which is elongated and engages the upper split portion of the split cylindrical tube. Engaging that pressure plate is an actuating bar or plate that is held in position by a second plate fixed to the bottom of the split cylindrical member and connected to the actuating bar by threaded members urged apart by springs. These springs have the purpose and advantage of urging the pressure plate to its release position thereby facilitating the release of the pressure force on the vehicle carried anti-sway rod.

For urging the pressure plate into engagement with the split tubular member and effecting the clamping connection, a threaded handle is provided, threadedly extending through the upper actuating plate and having its end engaging the pressure plate for moving it in a downward direction. This is a simplification over prior art constructions that require that the actuating member be interconnected in a significantly more complicated fashion.

Moreover the cylindrical construction of the present anti-sway bar mechanism improves the anti-sway characteristics and provides a much simplified and less complicated construction than provided in prior art devices.

DESCRIPTION OF THE DRAWINGS

FIG. 1 is a fragmentary view of a trailer showing the sway bar mechanism in position.

FIG. 2 is a side view of the sway bar sub-assembly taken generally along line 2—2 of FIG. 1.

FIG. 3 is a longitudinal section of the sway bar mechanism according to the present invention taken generally along line 3—3 of FIG. 1.

FIG. 4 is a cross-section taken generally along line 4—4 of FIG. 3 illustrating the actuator for the sway bar mechanism.

DETAILED DESCRIPTION OF THE PREFERRED EMBODIMENT

Referring to the drawings and particularly FIG. 1, an anti-sway bar 10 is provided inter-connecting a trailer 12 with a driving vehicle 14. The trailer is pivotally and universally connected to the driving vehicle 14 by a recess in trailer tongue 16 that fits over a ball 17 fixed to the driving vehicle.

The anti-sway bar mechanism 10 has for its purpose the resistance to the pivotal movement of the trailer 12 with respect to the driving vehicle 14 to dampen oscillations that frequently occur between the two creating a dangerous condition.

The anti-sway bar mechanism 10 is attached to the trailer 12 by an angle plate 19 fixed to the trailer by suitable fasteners 20. The other end of the anti-sway bar mechanism is fixed to the driving vehicle 14 by a laterally projecting plate 21.

As seen in FIG. 3, the anti-sway bar mechanism includes a stub shaft 23 having a threaded portion 24 that is clamped to the angle plate 19 by threaded nuts 26 and 27 holding the stub shaft 23 fixed with respect to the trailer.

The stub shaft carries a spherical ball 27' forming a universal connection with universal ring 28 having an inside spherical surface engaging the ball 27'.

Welded to the ring 28 is a horizontally extending stub shaft 30 that carries a split cylindrical member 32 and is fixed thereto by pins 33 also shown in FIG. 3.

As seen clearly in FIGS. 2 and 4, the cylindrical tubular member 32 is split as at 36 along a major portion of the length thereof.

Each half of the split cylindrical member 32 carries arcuate frictional segments 37 and 38 seen in FIGS. 3 and 4. The frictional elements 37 and 38 are made of a fibrous material similar to that of brake linings.

The split tubular member 32 is selectively and variably clamped with the frictional elements 37 and 38 against a solid cylindrical rod 40 telescopically received in the split tubular member 32.

Rod 40 is fixed to a universal ring 41 having a spherical inside surface universally pivotally mounted on ball 43.

Ball 43 is received on a stub shaft 45 that is fixed to the driving vehicle plate 21 by clamping nuts 47 and 48, respectively.

For the purpose of variably clamping the frictional elements 37 and 38 against the rod 40 and varying the anti-sway characteristics of mechanism 10, an actuating assembly 50 is provided. The actuating assembly includes a flat plate 52 welded to the lower half of the split tube 32 and carrying threaded members 54 and 55 that extend through an actuator or clamping plate 56. The springs 58 and 59 react between the plates 52 and 56 for the purpose of facilitating the release of clamping pressure on the rod 40.

An arcuate pressure plate 61 is provided having a substantial length and engaging the upper half of the tubular member 32 and exerting a clamping pressure against the top half of the tubular member while the bottom half of the tubular member reacts against the lower plate 52.

For the purpose of driving the pressure plate 61 in a downward direction to effect the clamping action, a threaded bent actuating member 63 is provided having a threaded portion 64 threadedly engaged in the actuating plate 56 and a laterally extending handle portion 65 that may have a rubber grip thereon. End 67 of the threaded actuator 63 engages the pressure plate 61 while reacting against the actuator plate 56 to urge the pressure plate 61 downwardly against the tubular member 32 as handle 65 is rotated in a direction to cause downward movement of the actuator member 63.

For the purpose of holding the actuator 63 in position against vibration and accidental turning, a spring 69 is provided that reacts against plate 56 at one end and a washer 72 at the other end which is held in position by nut 74 threaded on the actuator member 63.

I claim:

1. An anti-sway bar mechanism for a trailer, comprising; first pivot means adapted to and connected to the driving vehicle, second pivot means adapted to be mounted to the trailer, a first tubular member connected to one of the said pivot means, a second member slideable in said first tubular member and connected to the other pivot means, means for compressing said tubular member toward said second member to provide a sway resistant force, a first plate connected to one side of the tubular member and a pressure plate connected to the other side of the tubular member, an actuating plate for said pressure plate connected to react against said first plate, and a threaded actuating member threadedly engaged with said actuating plate and movably engaging the pressure plate.

2. An anti-sway bar mechanism for a trailer as defined in claim 1, wherein said tubular member and said second member are cylindrical.

3. An anti-sway bar mechanism for a trailer as defined in claim 2, wherein said pressure plate is elongated and arcuate in configuration.

4. An anti-sway bar mechanism for a trailer as defined in claim 1, wherein said threaded actuating member is spring released away from said actuating plate.

5. An anti-sway bar mechanism for a trailer, as defined in claim 1, wherein said first plate and said actuating plate are inter-connected by threaded members, and spring means urging said first plate and said actuating plate apart.

6. An anti-sway bar mechanism for a trailer, comprising; first pivot means adapted to and connected to the driving vehicle, second pivot means adapted to be mounted to the trailer, a first tubular member connected to one of the said pivot means, a second member slideable in said first tubular member and connected to the other pivot means, means for compressing said tubular member toward said second member to provide a sway resistant force, a first plate connected to one side of the tubular member and a pressure plate connected to the other side of the tubular member, an actuating plate for said pressure plate connected to react against said first plate, and a threaded actuating member threadedly engaged with said actuating plate and driving engaging the pressure plate, wherein said first plate and said actuating plate are inter-connected by threaded members, and spring means urging said first plate and said actuating plate apart.

* * * * *